United States Patent [19]

Hoeving et al.

[11] 4,280,295
[45] Jul. 28, 1981

[54] JIG-O-MATIC

[76] Inventors: Philip Hoeving, 613 Elgin St., N.E.; Michael Litovich, 29 Ash Dr., both of Weyburn, Saskatchewan, Canada

[21] Appl. No.: 115,512

[22] Filed: Jan. 25, 1980

[30] Foreign Application Priority Data

Oct. 30, 1979 [CA] Canada .................................. 338706

[51] Int. Cl.³ ............................................ A01K 87/00
[52] U.S. Cl. ............................................ 43/19.2; 74/63
[58] Field of Search .................... 43/19.2, 26.1; 74/63; 64/DIG. 2

[56] References Cited

U.S. PATENT DOCUMENTS

| 3,031,790 | 5/1962 | Duryea | 43/19.2 |
| 3,568,352 | 3/1971 | Hill | 43/19.2 |
| 3,600,837 | 8/1971 | Bristol | 43/19.2 |
| 4,120,112 | 10/1978 | McBain | 43/19.2 |

Primary Examiner—Stephen G. Kunin
Assistant Examiner—Robert P. Olszewski
Attorney, Agent, or Firm—James C. Wray

[57] ABSTRACT

An apparatus for providing movement to a fishing line comprising a plate attached to a shaft for rotational movement. An arm pivotally attached to the plate for pivotal movement about the axis of the shaft. Pin apparatus on the plate for restricting the pivotal movement of the arm relative to the plate. A pivotally mounted clip on the arm having spring biased jaws for holding a fishing line. As the plate is rotated the fishing line receives a slow upward movement followed by a fast sinking movement.

1 Claim, 2 Drawing Figures

JIG-O-MATIC

BACKGROUND OF THE INVENTION

This relates to a motor driven fish-jigging apparatus. It is an object of this invention to provide a device for providing movement to a fishing line, which is simple and inexpensive to manufacture and which includes a means for quickly and easily attaching and detaching the fishing line.

SUMMARY OF THE INVENTION

In accordance with this invention there is provided an apparatus for providing movement to a fishing line comprising a shaft having first and second ends adapted to be attached at said first end to a motor for rotation thereby, a plate fixed to said shaft at said second end and adapted to rotate about the axis of said shaft, an arm pivotally attached to said plate for pivotal movement about the axis of the shaft in a plane parallel to the plane of said plate, said plate including arm engaging means thereon to engage said arm to provide limits to the pivotal movement of said arm relative to said plate, said arm including a clip fastening means pivotally mounted thereon for holding a fishing line, whereby as the plate is rotated said arm engaging means will initially cause the arm to rotate at the same rotational speed as the plate causing relatively slow upward movement of the fishing line following which the arm is allowed to drop under the influence of gravity to thereby cause said fishing line to sink rapidly.

DESCRIPTION OF PREFERRED EMBODIMENT

Figure 1:
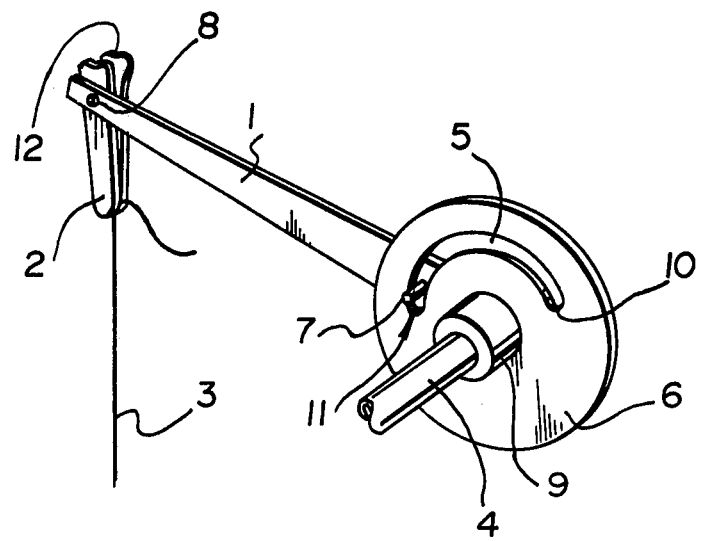
FIG. 1 is a perspective view of a first embodiment of the invention.

Referring to FIG. 1 there is shown a mechanism having a shaft 4 adapted to be rotated by a small motor (not shown) particularly an electric motor powered by a battery. This shaft is adapted to be supported for rotation near coupling member 9. Coupling member 9 is fixed to the disc 6 to translate the rotation of the shaft 4 to the disc 6.

On the side of the disc opposite to the coupling member 9, there is mounted at the centre of the disc an arm 1 which extends radially beyond the circumference of the disc 6. This arm is pivotally mounted at the centre of the disc thus permitting it to rotate relative to the disc 6 in a plane parallel to the plane of the disc 6.

A circular slot 5 is situated in the disc 1. This slot extends in a circular arc about the axis of the shaft 4 which coincides with the centre of the disc 6.

A pin 7 mounted on the arm 1 projects through the slot 5 and is adapted to contact the remote ends 10 and 11 of the slot to limit the movement of the arm 1 relative to the disc 6.

At the end of arm 1 remote from its point of pivotal attachment to disc 6 there is pivotally attached a clip 2 having jaws spring biased into contact with one another. This clip 2 is adapted to rotate about the pivotal attachment means 8 on the arm 1. As shown in FIG. 1 the clip 2 is adapted to hold a fishing line 3 so as to impart the desired movement to a lure (not shown) at the remote end thereof. The other end of the line may be held by the operator or attached to a holding means to prevent its loss in the event that the lure is taken by a fish.

In operation, the motor rotates shaft 4 which in turn rotates the disc 6. If the disc 6 is rotating in a clockwise direction as viewed in FIG. 1 the pin 7 on arm 1 engages the end 7 of the slot 5. This causes arm 1 to be rotated at the same rate as the disc 6. As a result of the rotation of the arm 1, the line 3 held by the clip 2 is raised. As the arm 1 reaches a point just beyond the topmost point of its travel the weight of the arm no longer presses the pin 7 against the end 11 but rather tends to move it in the other direction. Since there is no impediment to movement of the arm in that direction the arm is caused to fall until the pin 7 strikes the opposite end 10 of the slot 5. The falling of the arm 1 causes the lure on the end of the line 3 to sink rapidly in relation to the speed at which it rose. This relatively slow rise and rapid fall of the lure creates a movement which is attractive to fish.

It will be appreciated that the line 3 is easily attached to the clip 2 by pressing the thumb against lever 12. In the event a fish takes the lure the line is readily removed from the clip by tension in the line. It will also be appreciated that as the arm 1 rotates the clip will pivot to maintaining the same orientation. Since the plane of the disc is vertical during operation, the movement of the line 3 will not be interfered with by the device.

Figure 2:
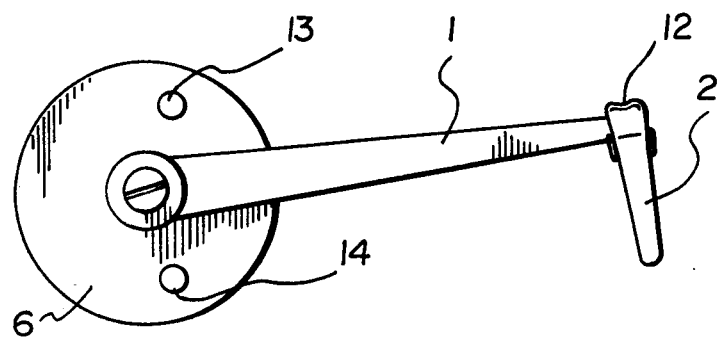
FIG. 2 is a plan view of a second embodiment of the invention.

FIG. 2 shows an embodiment similar to that of FIG. 1 in which the arm 1 does not have a pin 7 and the disc does not have a slot 5. Instead the pivotal movement of the arm 1 relative to the disc 5 is limited by means of pins 13 and 17 mounted on the disc in a manner to contact the edges of the arm 1 and thereby limits its movement relative to the disc 6.

What we claim as our invention is:

1. Apparatus for providing movement to a fishing line comprising a shaft having first and second ends adapted to be attached at said first end to a motor for rotation thereby, a plate fixed to said shaft at said second end and adapted to rotate about the axis of said shaft, an arm pivotally attached to said plate for pivotal movement about the axis of the shaft in a plane parallel to the plane of said plate, said plate including arm engaging means thereon to engage said arm to provide limits to the pivotal movement of said arm relative to said plate, said arm including a clip fastening means pivotally mounted thereon for holding a fishing line, whereby as the plate is rotated said arm engaging means will initially cause the arm to rotate at the same rotational speed as the plate causing relatively slow upward movement of the fishing line following which the arm is allowed to drop under the influence of gravity to thereby cause said fishing line to sink rapidly, said arm engaging means comprising a pair of spaced perpendicularly extending pins mounted on said plate adapted to engage said arm to limit pivotal movement thereof relative to said plate.

* * * * *